US010637960B2

(12) United States Patent
Srinivasan et al.

(10) Patent No.: US 10,637,960 B2
(45) Date of Patent: Apr. 28, 2020

(54) METHOD FOR BRIDGING PUBLISH/SUBSCRIBE BROKERS FOR GUARANTEED LOW-LATENCY DELIVERY

(71) Applicant: infiswift Inc., San Ramon, CA (US)

(72) Inventors: Jayendran Srinivasan, Milpitas, CA (US); Venkatesa Prasannaa Selvaraj, Tamil Nadu (IN); Saravanan Thulasingam, Austin, TX (US)

(73) Assignee: INFISWIFT TECHNOLOGIES, INC., San Ramon, CA (US)

( * ) Notice: Subject to any disclaimer, the term of this patent is extended or adjusted under 35 U.S.C. 154(b) by 196 days.

(21) Appl. No.: 15/331,680

(22) Filed: Oct. 21, 2016

(65) Prior Publication Data

US 2018/0115616 A1 Apr. 26, 2018

(51) Int. Cl.
*H04L 29/08* (2006.01)

(52) U.S. Cl.
CPC ............ *H04L 67/32* (2013.01); *H04L 67/141* (2013.01); *H04L 67/2842* (2013.01)

(58) Field of Classification Search
CPC ..... H04L 67/16; H04L 41/0631; H04L 67/42; H04L 69/24; H04L 67/02; H04L 67/141; H04L 67/32; H04L 67/2842
USPC ........................................................ 709/223
See application file for complete search history.

(56) References Cited

U.S. PATENT DOCUMENTS

| 9,038,091 | B2 | 5/2015 | Jonnagadia |
| 9,817,657 | B2 | 11/2017 | Hill |
| 2002/0174367 | A1 | 11/2002 | Kimmel |
| 2004/0019645 | A1* | 1/2004 | Goodman ............ G06Q 10/107 709/206 |
| 2005/0021622 | A1* | 1/2005 | Cullen .................. G06Q 30/02 709/204 |
| 2007/0245018 | A1* | 10/2007 | Bhola ................. G06F 21/6218 709/225 |
| 2010/0268764 | A1 | 10/2010 | Wee |
| 2010/0333111 | A1 | 12/2010 | Kothamasu |

(Continued)

OTHER PUBLICATIONS

D. Farinacci, et al., RFC 2784, Generic Routing Encapsulation (GRE), Mar. 2000.

(Continued)

*Primary Examiner* — Brian Whipple
*Assistant Examiner* — John Fan
(74) *Attorney, Agent, or Firm* — Knobbe, Martens, Olson & Bear, LLP

(57) ABSTRACT

Methods for bridging computers functioning as Publish/Subscribe brokers are provided to build a distributed cluster for scalability by enabling publishers to connect to one broker and subscribers to that publisher to connect to a different broker. In one aspect, a method includes listening to an internal bridge port on one broker for receiving bridge connections from other brokers in the cluster, and in parallel, connecting to the internal bridge ports of each of the other brokers in the cluster, waiting for all such incoming and outgoing bridge connections to be completed, and then opening up the external port for serving actual clients. The method also includes creating separate bridges for each direction of traffic to make the broker code completely symmetric and also supporting the creation of an arbitrary number of bridge connections between each pair of brokers for each direction to reduce latency.

21 Claims, 12 Drawing Sheets

(56) References Cited

U.S. PATENT DOCUMENTS

| | | |
|---|---|---|
| 2011/0320888 A1 | 12/2011 | Jonnagadia |
| 2012/0215856 A1* | 8/2012 | Beardsmore ............ H04L 51/26 |
| | | 709/206 |
| 2013/0138814 A1 | 5/2013 | Kotecha |
| 2013/0262931 A1 | 10/2013 | Siddalingesh |
| 2015/0024677 A1 | 1/2015 | Gopal |
| 2015/0237157 A1 | 8/2015 | Wang |
| 2016/0051203 A1 | 2/2016 | Furness, III |
| 2016/0350424 A1* | 12/2016 | Chen ................. G06F 17/30867 |
| 2017/0134536 A1 | 5/2017 | Tessiore |
| 2017/0237815 A1 | 8/2017 | Arsenault |
| 2018/0011694 A1 | 1/2018 | Al-Fuqaha |
| 2018/0091586 A1 | 3/2018 | Auradkar |
| 2018/0091588 A1 | 3/2018 | Qin |
| 2018/0183862 A1 | 6/2018 | Huh |
| 2018/0255152 A1 | 9/2018 | Jeuk |

OTHER PUBLICATIONS

"3G", Newton's Telecom Dictionary, $21^{st}$ ed., Mar. 2005.
MQ Telemetry Transport (MQTT): V3.1 Protocol Specification, IBM: Developer Works, 2014.
Severance, "Discovering JavaScript Object Notation", Computer, 45 (2012), pp. 6-8.

\* cited by examiner

METHOD FOR BRIDGING PUBLISH/SUBSCRIBE BROKERS FOR GUARANTEED LOW-LATENCY DELIVERY

BACKGROUND OF THE INVENTION

The present disclosure generally relates to the transmission of data over a network, and more particularly to the use of a computing device to communicate over a network.

The Internet of Things presents the opportunity to connect millions of devices that were once considered too simple or inexpensive to connect to the Internet, or that were believed to be sufficiently autonomous to require no centralized management. It has also created tremendous opportunities to collect data from those heretofore unconnected devices and use that data for a variety of purposes: improving efficiency, recognizing anomalies, improving product design and many others.

The Internet has largely evolved based on a client-server architecture: content is generally stored on and served from centralized computers designed for that purpose (often organized in highly sophisticated server farms) and presented on devices designed for viewing, listening or otherwise consuming that content. By specializing the functions of connected computers using such a hub-and-spoke model, the Internet has become enormously large and efficient: a system that only 20 years ago struggled to share small static images now permits millions of television watchers to stream high-definition movies every day.

The "original" Internet was architected to connect computers: devices with significant processing power, memory, user interfaces, etc., all of which require power. With the advent of the Internet of Things, millions or even billions of new devices will be connected to the Internet. Many of those devices will be headless (i.e., have very limited or non-existent user interfaces). Many of them will be low-cost items with minimal capabilities in terms of processing, storage, bandwidth, etc. Many will not be connected to a power source, and will be dependent on small batteries, solar cells, and even various forms of energy harvesting or ambient power, etc. Some of these devices will have to connect and communicate using extremely lightweight protocols in order to minimize power consumption. Such "thin" devices place a premium on efficient control and data exchange.

Another key aspect of the Internet of Things as currently implemented is a consequence of the nature of the protocols used to establish and maintain connections between devices. The Internet largely runs on a protocol called Transmission Control Protocol and Internet Protocol, or TCP/IP. TCP/IP dates back to DARPA and was first used in the 1970s as a way to design a network that provides only the functions of efficiently transmitting and routing traffic between nodes, leaving all other intelligence to be located in the networked devices themselves. Using a simple design, it became possible to easily connect almost any device or local network to the larger ARPANET, irrespective of the local characteristics of those devices.

The requirements of the Internet of Things have lead to the creation of new protocols (most of which work within the TCP/IP framework) that address the difficulties created when managing large numbers of thin devices.

One such protocol is MQTT. MQTT (formerly known as MQ Telemetry Transport) is an ISO standard (ISO/IEC PRF 20922) publish-subscribe-based "lightweight" messaging protocol for use on top of the widely used TCP/IP protocol. It is designed for connections with remote locations where a small code footprint is preferred or network bandwidth is limited. The publish-subscribe messaging pattern generally includes a message broker. The broker is responsible for distributing messages to interested clients based on the topic of a message. The MQTT protocol is used to implement a publish-subscribe system. Clients connect to a broker via a TCP/IP connection, and MQTT control packets are sent over that connection. The SUBSCRIBE packet is used by a client to inform the broker that it wishes to receive messages published for a certain topic. The PUBLISH packet is used by the clients to inform the broker of new messages for a given topic. The broker's role is to keep track of the subscribers and inform them of new messages whenever any new message is received from any client for the topic those subscribers have expressed interest for. Since each connection would consume a certain amount of CPU usage, memory, and network resources on the broker computer, each broker can only maintain a finite number of connections. In order to support more clients than those upper bounds, more broker instances can be deployed. This would also generally mean that such broker instances are hosted behind a standard load balancer, as is well understood in the art, so that clients still connect to one broker IP address, but internally those connections are served by different broker instances. When a cluster of brokers are connected through a load balancer, a subscriber for a topic may connect to Broker 1 while the publisher of the topic may connect to Broker 2.

The publish-subscribe architecture of MQTT has numerous advantages for efficient operation of edge devices, but it also creates a challenge not present in traditional HTTP-based server-to-server communication, such as when multiple clients connect to a web server. Because HTTP is a request/response protocol, when request #1 is received by a server, that server typically updates a common backend database. A subsequent request #2 received by a different server fetches the updated value with little or no latency between the recording of the updated value by the first server and the time when other servers can retrieve that value. In that case, there is no direct communication needed between the two servers.

If this approach is applied to a Publish/Subscribe Protocol, when a publisher connected to Broker 1 publishes a message, Broker 1 would in turn record the published message in a database. Broker 2 periodically polls that database for new messages and then forwards them to its subscribers. But this approach generally increases the latency of the system. For example, if Broker 2 polls the database once every 100 milliseconds, the latency for a new message that just missed being included in the previous polling action by a given broker would be at least 100 milliseconds. Because polling is in a sense a wasteful process (in that it diverts resources away from communication with external publishers and subscribers), a trade-off is created: more frequent polling reduces latency, but effectively reduces the number of edge devices a given broker can manage; less frequent polling increases latency.

Another approach would be for Broker 1 to post the messages it receives to some form of a message queuing service, which would then dispatch those messages to Broker 2. This introduces an extra hop in between Broker 1 and Broker 2 and would thus also increase latency. This approach introduces extra complexity because it requires a new message queuing service in addition to the brokers themselves.

Another approach would be to create a direct bridge connection between the brokers so that all messages can be exchanged bi-directionally between brokers. Such basic bridging of MQTT brokers is well-known in the prior art. However, such basic bridging, which typically utilizes a single TCP connection as a bridge would suffer from one or more of the following limitations:

1. There would be significant difficulty in adding a new broker to collection of brokers behind a given load balancer without causing a loss of messages sent prior to bridge establishment.
2. A bridge of fixed bandwidth is likely to experience congestion during heavy traffic between the brokers, or be wasted during low-traffic periods if it is scaled for the worst-case scenario.
3. Special local/remote prefixes would be required to avoid fan-out loops in bridging. A fan-out loop occurs when (a) Broker 1 forwards a message to Broker 2, (b) Broker 2 forwards that same message back to Broker 1, and so on. This damaging problem is typically avoided in prior art by using special prefixes for the topics being forwarded so that Broker 2 knows which messages to forward to Broker 1 and which ones not to be forwarded. However, using such prefixes both reduces efficiency (by adding computational steps and increasing the size of each message) and increases code complexity, creating additional opportunities for bugs and errors.
4. Asymmetric functionality between Broker 1 and Broker 2 depending upon who initiates the bridge connection. This makes the implementation of such algorithms prone to deadlocks or creation of extra, unused bridges. In an asymmetric architecture, where there is only one bridge connection between two brokers, it may not be clear which broker should create it. Will Broker 1 be the initiator of the connection and Broker 2 the recipient of the connection or vice-versa? How do the brokers know who will do what? What if two brokers attempt to initate a bridge connection to each other around the same time? The result may be multiple connections, or one, or perhaps even none. If an extra, unused bridge is created, is it dropped? If so, how do the brokers know which one to drop? If both brokers seek to drop an unused connection, they might end up dropping all of them.

Thus there currently exists no satisfactory method of connecting multiple brokers in a subscribe-publish architecture. It would be advantageous to provide an efficient and scalable mechanism for the communication between the brokers in order to reliably serve the published messages to the proper subscribers while introducing the least possible latency.

The present disclosure introduces advanced bridging techniques that overcome the above-mentioned limitations in an elegant way to provide a simple implementation.

SUMMARY OF INVENTION

According to one embodiment of the present disclosure, a computer-implemented method for bridging Publish/Subscribe brokers in a cluster is provided. The method includes listening to an internal bridge port on one broker for receiving bridge connections from other brokers in the cluster, and in parallel, connecting to the internal bridge ports of each of the other brokers in the cluster, waiting for all such incoming and outgoing bridge connections to be completed, and then opening up the external port for serving the actual clients. The method also includes monitoring the health of the bridge connection and, upon detection of connection failure, storing messages in a persistent store and replaying them on the bridge connection once it is restored. The method also includes creating separate bridges for each direction of traffic in order to make the broker code completely symmetric and also supporting the creation of an arbitrary number of bridge connections between each pair of brokers for each direction to reduce latency. Because the broker code is symmetrical, the same code may be deployed on one broker or 100 brokers, without requiring changes or adaptation, whereas traditional client-server architectures are not symmetrical, and where a single computer includes both client and server functionality, finding, understanding and debugging problems is more complex.

According to another embodiment of the present disclosure, a system for bridging Publish/Subscribe brokers in a cluster is provided. The system includes a memory that includes instructions, and a processor. The processor is configured to execute the instructions to implement the above-mentioned method.

According to a further embodiment of the present disclosure, a machine-readable storage medium includes machine-readable instructions for causing a processor to execute the instructions to implement the above-mentioned method.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

DETAILED DESCRIPTION OF THE INVENTION

In the following detailed description, numerous specific details are set forth to provide a full understanding of the present disclosure. It will be apparent, however, to one ordinarily skilled in the art that the embodiments of the present disclosure may be practiced without some of these specific details. For example, the invention is described in the context of the MQTT protocol as a specific example of a Publish/Subscribe system, but this disclosure is in no way limited to MQTT protocol. In other instances, well-known structures and techniques have not been shown in detail so as not to obscure the disclosure.

Figure 1:
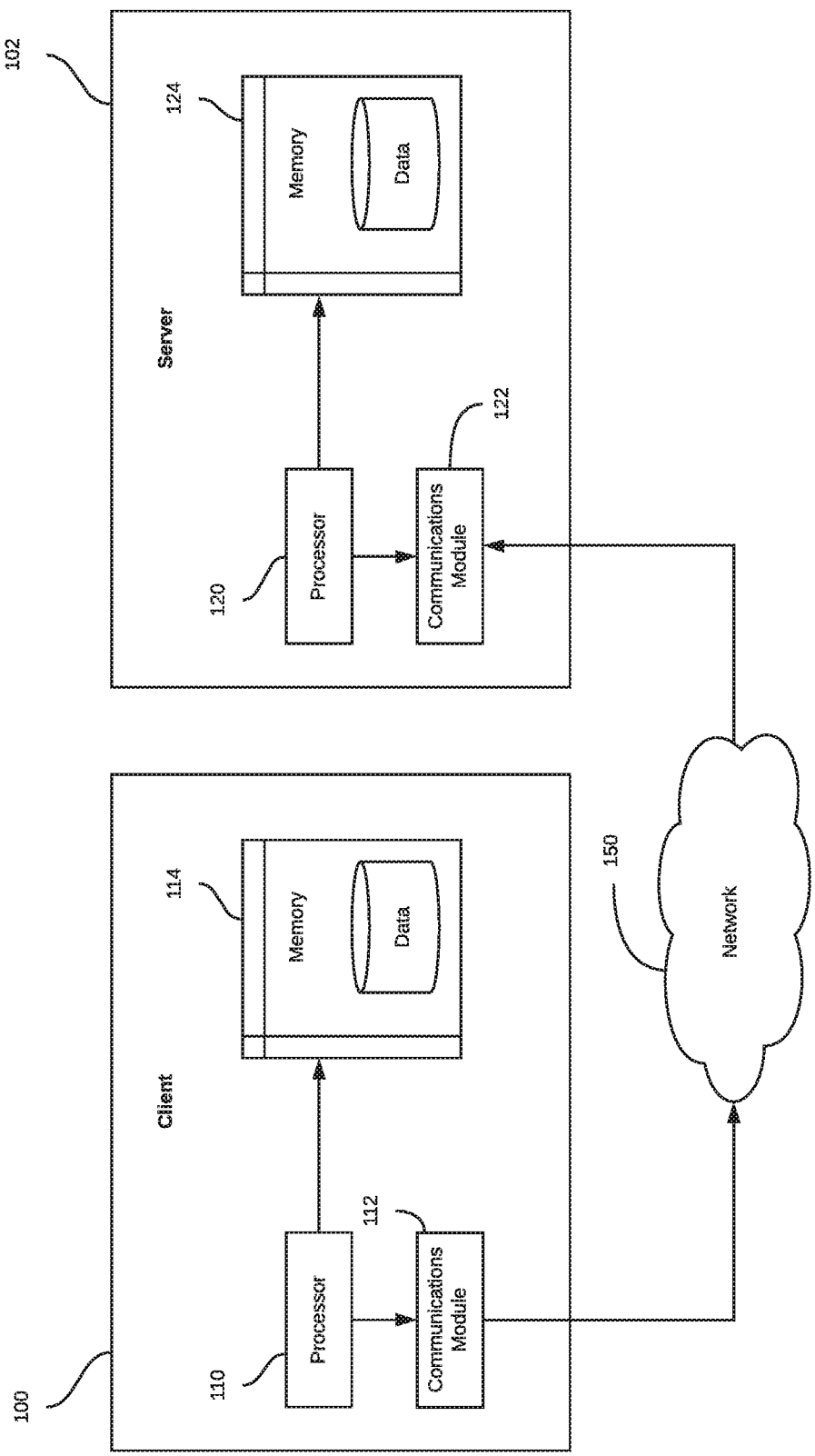
FIG. 1 is a block diagram illustrating an example computer system with which the client and server of FIG. 2 can be implemented.

FIG. 1 is a block diagram illustrating computer systems connected as client and server as discussed in more detail below. Client computer 100 may be a conventional computer, or may be a handheld and/or wired or a wireless device such as a tablet, smart phone, networked industrial sensor, home automation node, cellular telephone or any other device capable of accessing the network. Client computer 100 may utilize a browser configured to interact with the World Wide Web. Such browsers include but are not limited to Google Chrome, Mozilla Firefox, Opera or Apple Safari. They may also include browsers used on handheld and wireless devices. Client computer is comprised of components including a processor 110, which may comprise a processor such as those sold by Intel and AMD. Other processors may also be used, including general-purpose processors, multi-chip processors, embedded processors and the like. Client computer 100 also comprises communications module 112, which may comprise one or more network interface cards or other means of connecting computer 100 to a network. Client computer 100 also comprises memory 114, which may comprise random access memory (RAM), electronically erasable programmable read only memory (EEPROM), read only memory (ROM), hard disk, floppy disk, CD-ROM, optical memory, or other method of storing data. Similarly, server 102 is comprised of components including a processor 120, which may comprise a processor such as those sold by Intel and AMD. Other processors may also be used, including general-purpose processors, multi-chip processors, embedded processors and the like. Server 102 also comprises communications module 122, which may comprise one or more network interface cards or other means of connecting computer 100 to a network. Server 102 also comprises memory 124, which may comprise random access memory (RAM), electronically erasable programmable read only memory (EEPROM), read only memory (ROM), hard disk, floppy disk, CD-ROM, optical memory, or other method of storing data. It should be noted that "client" and "server" are defined based on the roles roles played in a given context. In practice a client may play the role of a server, and a server may sometimes play the role of a client. In the context of multiple connected brokers, each broker plays the role of both client and server according to the direction of the bridge. Client 100 and server 102 are connected via a network 150. Presently preferred network 150 comprises a collection of interconnected public and/or private networks that are linked to together by a set of standard protocols to form a distributed network. While network 150 is intended to refer to what is now commonly referred to as the Internet, it is also intended to encompass variations which may be made in the future, including changes additions to existing standard protocols.

Figure 2:
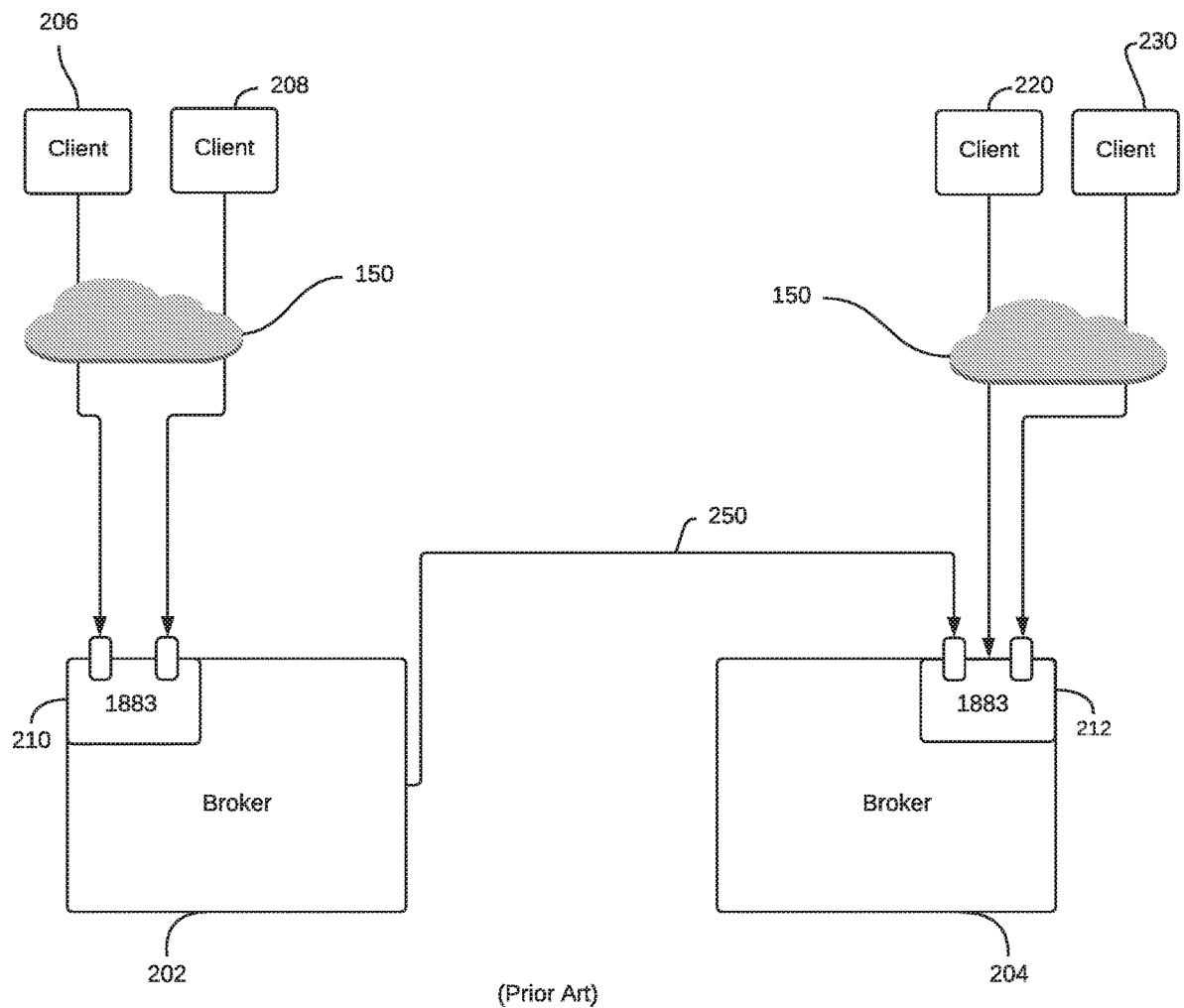
FIG. 2 shows a single bridge implementation as found in the prior art.

FIG. 2 shows a single-bridge implementation of a publish-subscribe environment as found in prior art. The example shown includes two brokers, 202 and 204. Broker 202 connects to clients 206 and 208 over network 150. That connection to broker 202 may be made by connecting to a public port on broker 202 such as port 1883 (shown as 210 in FIG. 2), but other ports may also be used for this connection. Similarly, broker 204 connects to clients 220 and 230 over network 150 by connecting to a public port 212 on broker 204, but private ports could be used for this function as well.

Without appropriate means for sharing information between broker 202 and broker 204, the publish-subscribe architecture will not permit, for example, client 220 to subscribe to messages published by client 206, because they are connected to two different brokers. In order to enable such communication, a connection between the two (or more, in more complex environments) brokers is used. Thus in the prior art, broker 202 is connected to broker 204 via TCP connection 250. Some of the disadvantages of connecting brokers in this fashion were previously discussed.

Figure 3:
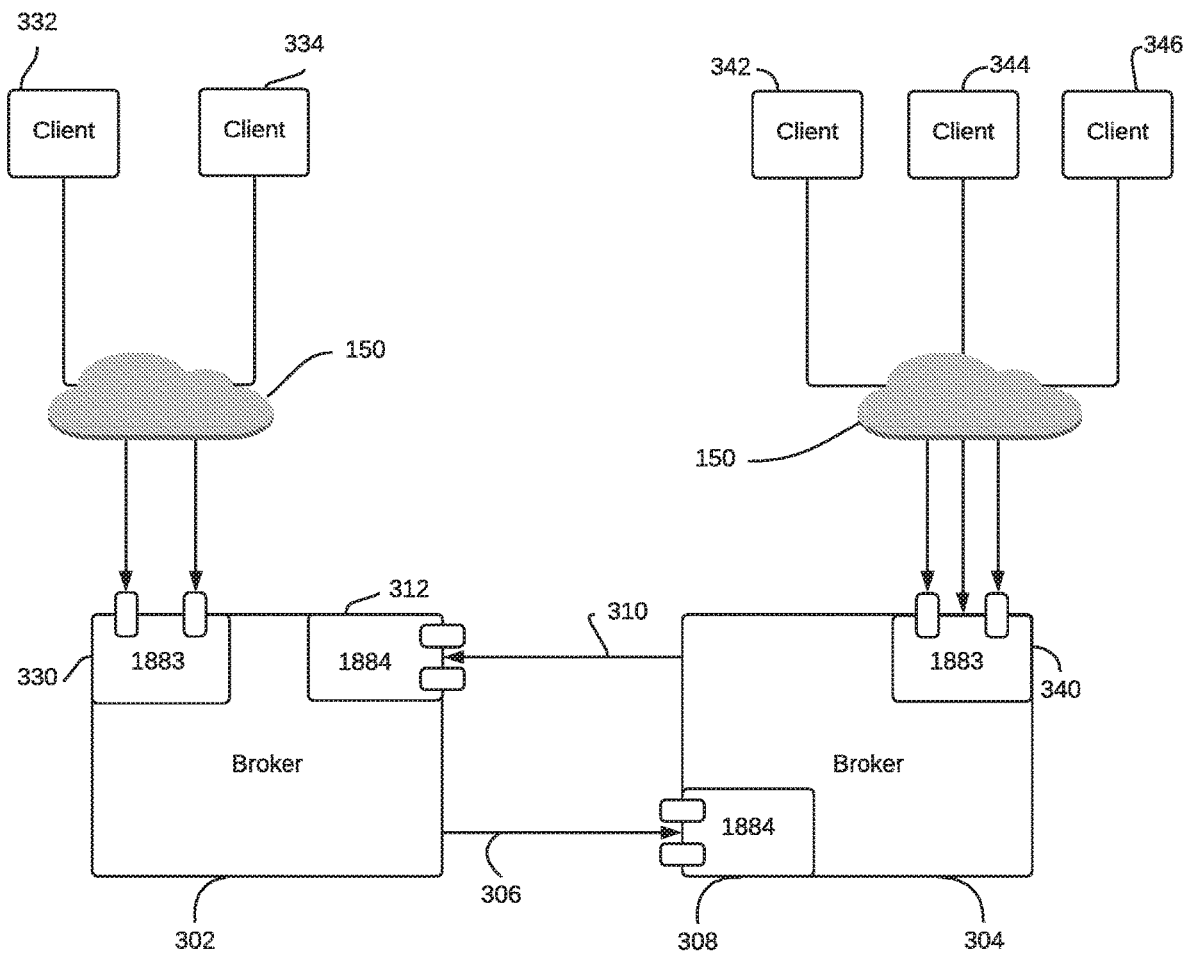
FIG. 3 illustrates an example of the subject invention with two brokers, each with one bridge to receive messages published on the other broker.

In contrast, the subject invention provides an effective means for connecting multiple brokers that substantially eliminates latency and maximizes efficient utilization of server resources. FIG. 3 illustrates an example in which two brokers employ one bridge each in order to receive messages published on the other broker according to the teachings of the subject invention. Broker 302 initiates an outbound connection 306 to broker 304 which has opened its internal bridge port 308 (generally using port 1884). Similarly, broker 304 initiates an outbound connection 310 to broker 302 which has opened its own internal bridge 312. Once these two connections are established, broker 302 opens up public port 330 (generally using port 1883) for clients that publish/subscribe to that broker. Clients 332 and 334 connect via network 150 to public port 330. Broker 304 opens its own public port 340 in order to connect via network 150 to clients 342, 344 and 346.

Bridge connections 306 and 310 permit efficient communication between subscribers and publishers connected to different brokers. For example, If client 332 publishes a message to which client 344 is subscribed, the architecture described in FIG. 2 would not permit client 334 to receive the message. But with the subject invention, when client 332 publishes a message, it is received via network 150 on public port 330 on broker 302. Broker 302 in turn transmits that message to broker 304 via bridge connection 306, and broker 304 in turn transmits the message to client 344 via its own public port 340.

Figure 4:
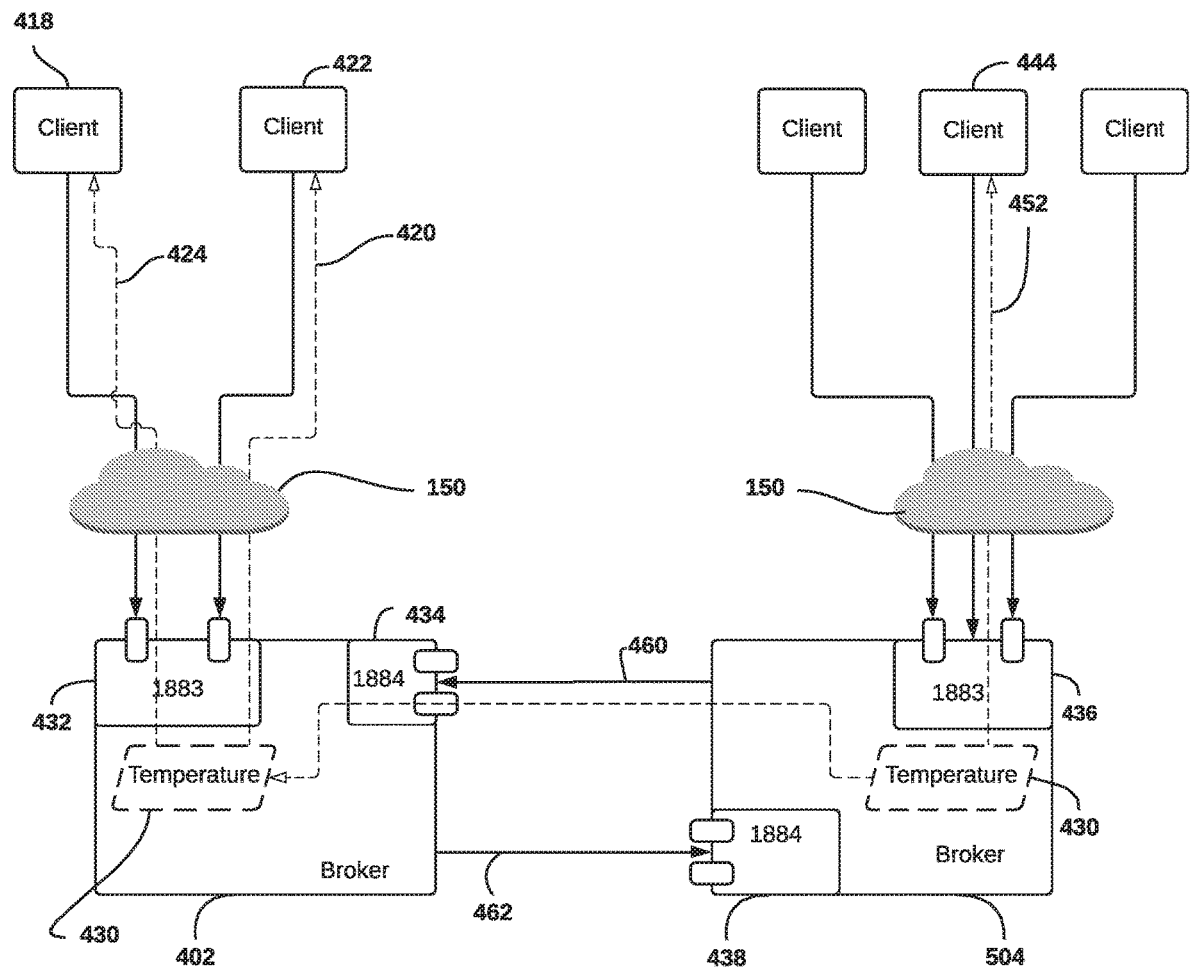
FIG. 4 builds up on the system shown in FIG. 3 to illustrate an example topic published by a client on Broker 1 which is subscribed to by a client connected to Broker 2, and hence will need the bridge from Broker 2 to Broker 1.

FIG. 4 represents a specific example of how the bridge architecture of the instant invention permits a topic published by a first client on Broker 1 to be shared with a second client that is connected to Broker 2 and is subscribed to messages from client 1.

Here, client 422 subscribes 420 to a topic 430 called Temperature XYZ123 after connecting to public port 432 on Broker 402 via network 150. Topic 430 may, for example, consist of regular reports 424 of readings generated by a thermistor contained within a specific wall-mounted sensor or a networked thermostat at a specific location, shown as client 418. Similarly, Client 444 also subscribes 452 to topic 430 on broker 404 after connecting to Broker 404, also via network 150 and public port 432.

When Client 418 publishes message 424 containing information about topic Temperature 430 to Broker 402, Broker 402 sends this message 424 to both Client 422 via network 150 and to broker 404 via private port 434 and the connection 460 previously opened by broker 404. Broker 404 would then forward this message to subscribed client 444 via public port 436 and network 150. Messages may automatically be sent by Broker 402 to all other brokers that maintain bridge connections with Broker 402, or other methods of optimizing traffic between brokers may be utilized. In the event (not shown in FIG. 4) that a client connected to broker 402 was subscribed to a topic being published by a client connected to broker 404, those messages would be sent by broker 404 using private port 438 and connection 462. This instance is illustrated in FIG. 5.

Figure 5:
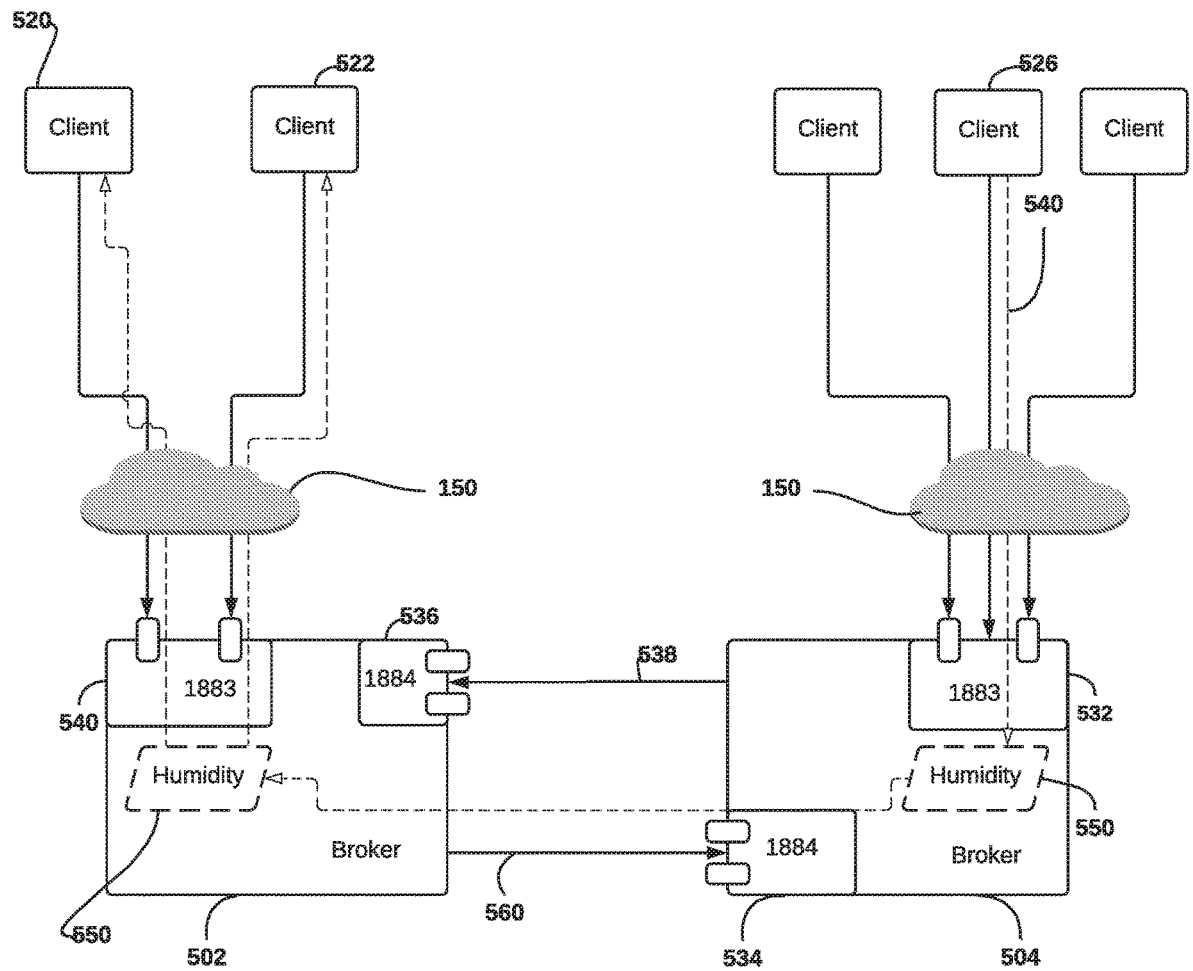
FIG. 5 illustrates an example topic published by a client on Broker 2 which is subscribed to by a client connected to Broker 1, and hence will need the bridge from Broker 1 to Broker 2.

FIG. 5 illustrates an example topic published by a client on second broker 504 which is subscribed to by a client connected to first broker 502 via network 150 and public port 540 and hence will need the bridge 560 from second broker 504 to first broker 502. This communication uses a bridge running in the opposite direction relative to the bridge illustrate in FIG. 4. Here, client 520 and client 522 subscribe to a topic called Humidity 530 via network 150 to broker 502. Client 526 publishes a message 540 for the topic Humidity 550 via network 150 and public port 532 to broker 504. Broker 504 fans out this message to broker 502 via private port 534 and incoming bridge 560 from broker 502. Broker 502 then forwards it to subscribed clients 520 and 522. In the event (not shown in FIG. 5) that a client connected to broker 504 was subscribed to a topic being published by a client connected to broker 502, those messages would be sent by broker 502 using private port 536 and connection 538.

Figure 6:
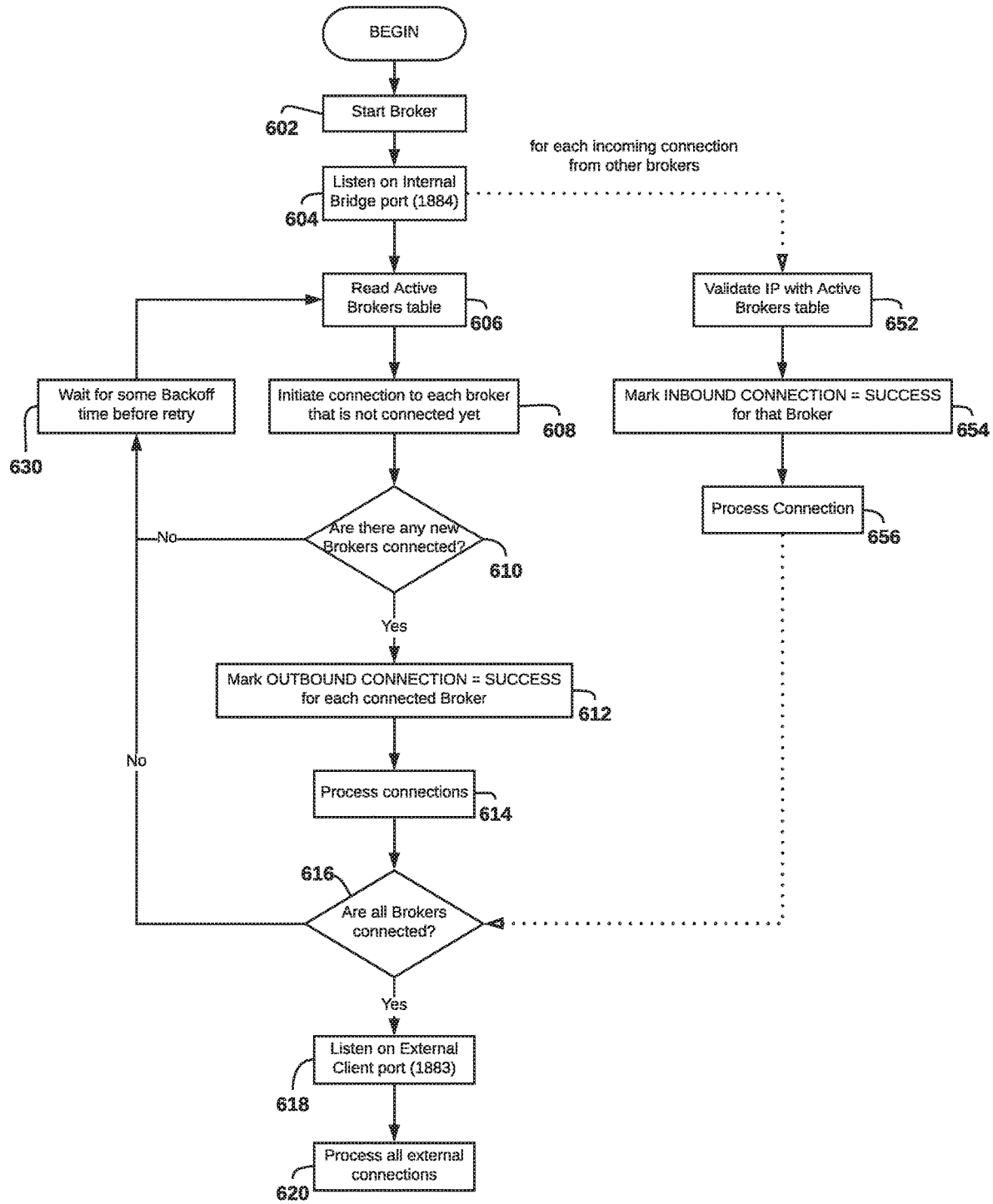
FIG. 6 depicts the flowchart for the initial bridge establishment algorithm on each broker.

FIG. 6 is a flowchart for the initial bridge establishment algorithm on each broker. Upon starting 602, a broker that is initiating the process of establishing bridge connections to other brokers listens on its internal bridge port (such as port 1884) 604. It then performs two asynchronous operations.

In one process, for each incoming connection request from other requesting brokers, the broker stepping through the connection process validates the source IP address of the requesting broker to make sure it is listed in the Active Brokers Table 652. This step is important as a security precaution: if a computer executing malicious code connects to a broker, it may gain access to all of the messages that pass through that broker. If the IP address of the requesting broker is valid, the bridge-making broker marks the inbound connection from that requesting broker as SUCCEESS 654. It then proceeds to process the connection 656 by doing the necessary read/write operations.

In the second operation, the bridge-making broker reads the active brokers table 606 to find the IP addresses of the other brokers to which it should connect, and asynchronously initiates the outbound connection to each broker on that list that is not yet connected 608. It then waits for one or more of those connections to be completed. The bridge-making broker then checks if any of those brokers has connected 610, and if so, it then marks that the outbound connection for that broker as a SUCCESS 612 and proceeds to process that connection by performing the necessary read/write operations 614. The bridge-making broker then checks if all the inbound and outbound connections for all brokers are marked as SUCCESS 616.

If so, it then proceeds to open the external port (such as 1883) to which the publishers and subscribers can subsequently connect. It then processes each external connection by forwarding the published messages to the subscribers both locally and via the remote bridges 620.

Figure 7:
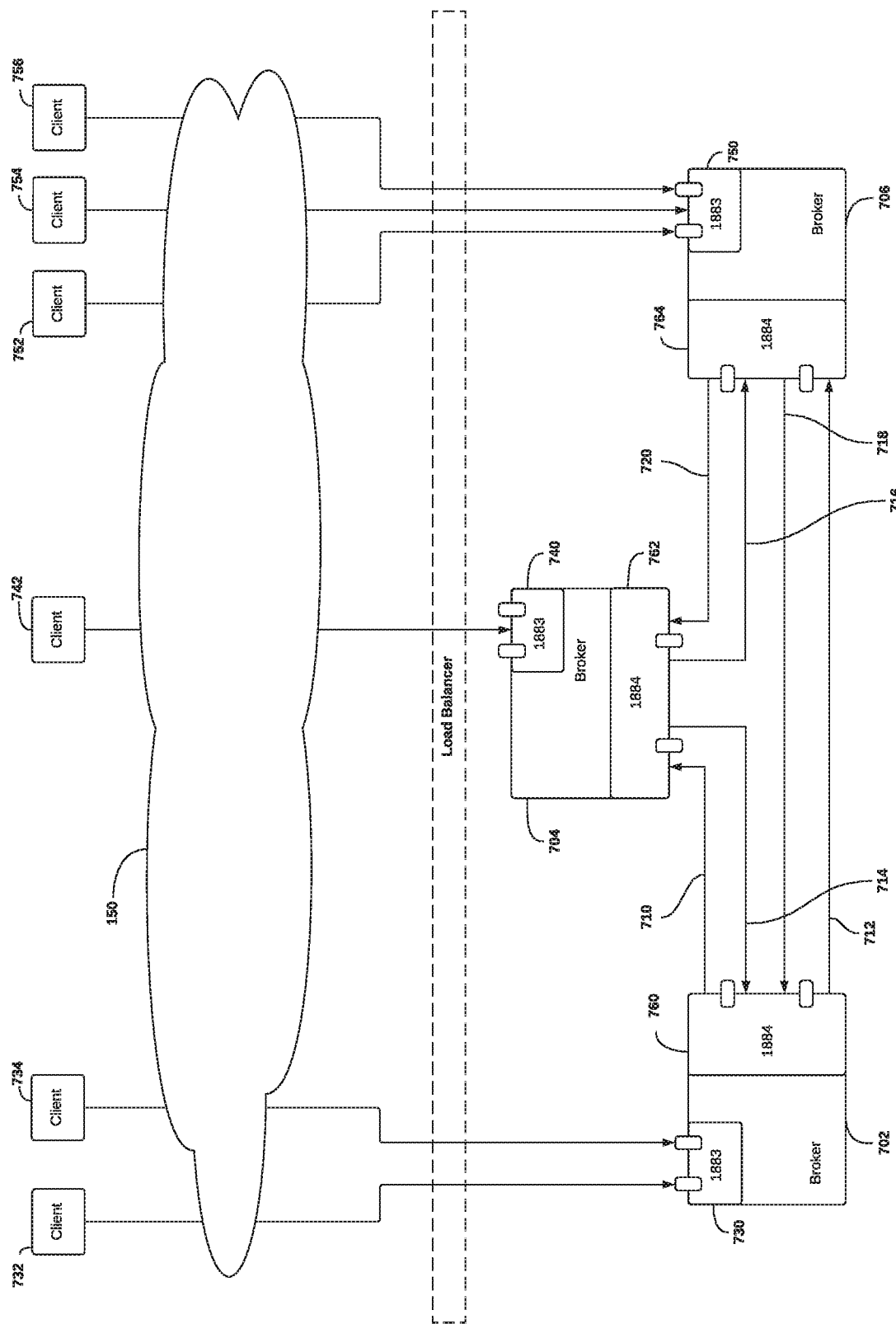
FIG. 7 illustrates an example with three brokers, each with one outbound bridge to receive messages published by clients on each of the other brokers and one inbound bridge to send messages published by clients connected to it, to the each of the other brokers.

If not all inbound and outbound connections have been marked as successful, the bridge-making broker then waits for some back-off time 630 and retries the outbound connection operations FIG. 7 illustrates an example with three brokers 702, 704 and 706, each with one outbound bridge to receive messages published by clients on each of the other brokers and one inbound bridge to send messages published by clients connected to it, to the each of the other brokers. Thus using private port 760, broker 702 established outbound bridge 710 with broker 704 and outbound bridge 712 with broker 706; broker 704 uses private port 762 to establish outbound bridge 714 with broker 702 and outbound bridge 716 with broker 706; broker 706 uses private port 764 to establish outbound bridge 718 with broker 702 and outbound bridge 720 with broker 704.

As in previous figures, once these bridge connections have been created, broker 702 opens up public port 730 (generally using port 1883) for clients that publish/subscribe to that broker. Clients 732 and 734 connect via network 150 to public port 730. Broker 704 opens its own public port 740 in order to connect via network 150 to client 742, and broker 706 opens public port 750, which permits clients 752, 754 and 756 to connect.

Figure 8:
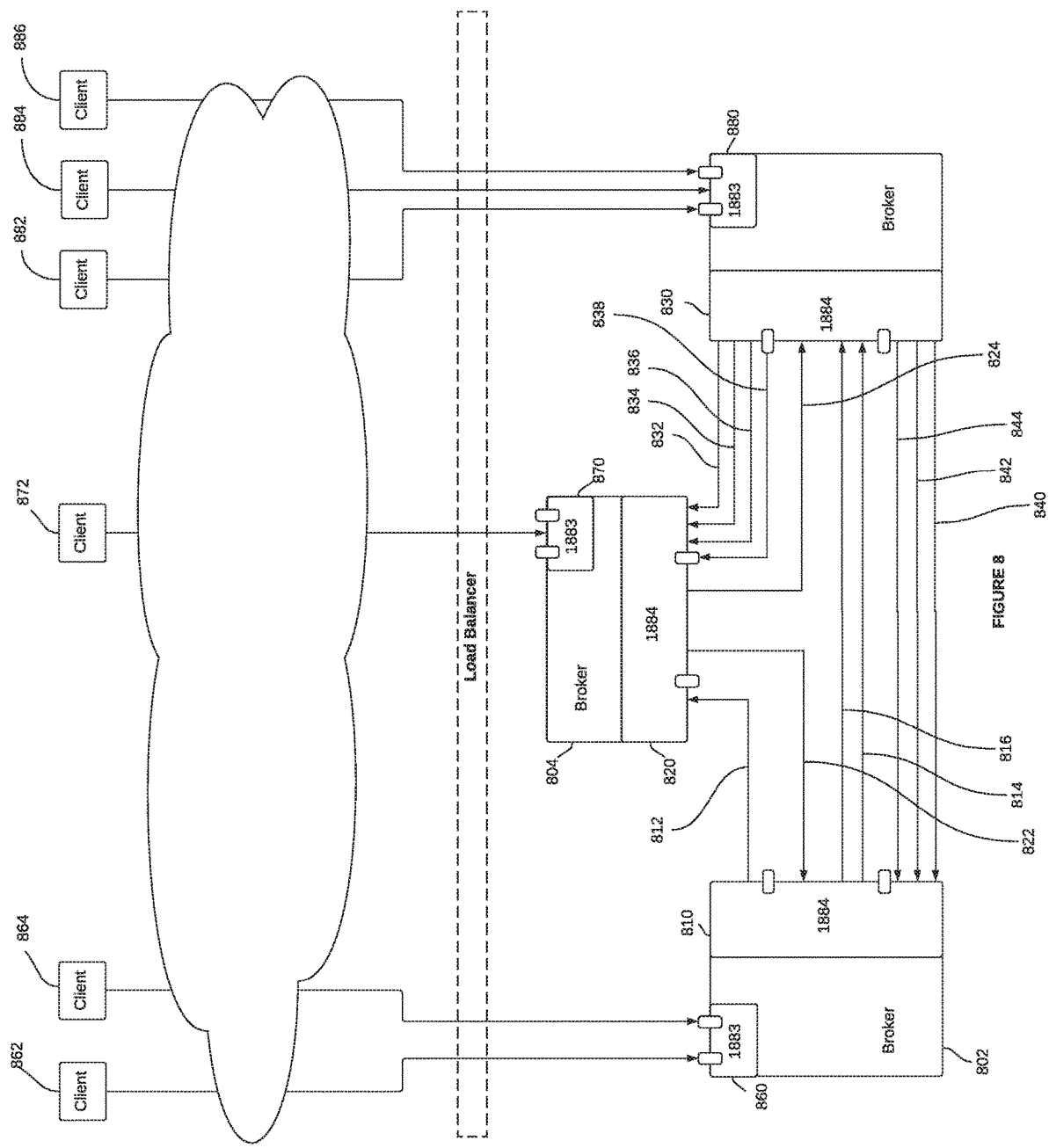
FIG. 8 illustrates an example with an arbitrary number of bridge connections per direction between a pair of brokers to improve scalability and reduce latency.

In some applications, particularly those with a large number of subscribers on one broker that are subscribed to publishers connected to a different broker, a single bridge per direction between brokers may be insufficient to support efficient scaling. FIG. 8 illustrates an embodiment of the subject invention in which multiple bridge connections per direction are used between a pair of brokers to improve scalability and reduce latency. Using private port 810, Broker 802 has one outbound bridge 812 with Broker 804 and two outbound bridges 814 and 816 with Broker 806. Broker 804 has one outbound bridge 820 to Broker 802 and one outbound bridge 822 to Broker 804. Broker 806 has four outbound bridges 830, 832, 834 and 836 to Broker 804 and three outbound bridges 840, 842 and 844 to Broker 802. As in previous figures, once these bridge connections have been created, broker 802 opens up public port 860 (generally using port 1883) for clients that publish/subscribe to that broker. Clients 862 and 864 connect via network 150 to public port 860. Broker 804 opens its own public port 870 in order to connect via network 150 to client 872, and broker 706 opens public port 880, which permits clients 882, 884 and 886 to connect.

FIG. 8 shows a single instance of the multi-bridge concept; those skilled in the art will recognize that numerous variations are possible. In general, it may be expected that when a publisher on a first broker has a large number of subscribers on a second broker, it may be advisable to create additional bridges from said first broker to said second broker.

Figure 9:
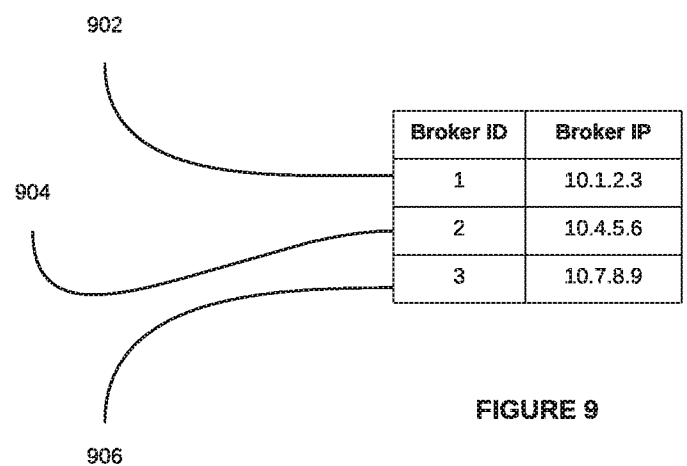
FIG. 9 shows sample entries in the Active Brokers Table for a cluster that has three brokers.

FIG. 9 shows sample entries in the Active Brokers Table (900) for a cluster that has three brokers. The Broker IPs are shown as private IP addresses in order to lock down the bridge ports to be accessible only to the other brokers which are in the same private network space and not to the clients (publishers/subscribers). Thus broker 902 has internal ID #1 and is located on the internal network at IP address 10.1.2.3;

broker 904 has internal ID #2 and is located on the internal network at IP address 10.4.5.6; and broker 906 has internal ID #3 and is located on the internal network at IP address 10.7.8.9. In a large installation, the table will of course be much longer.

The invention described in the present disclosure allows each broker in the Publish/Subscribe cluster to be initialized independent of each other with no particular ordering requirements. To achieve this, each broker is provided a table of Active Brokers (as illustrated in FIG. 9) as the initialization data. This is the table that informs each broker of the information corresponding to the other brokers in the cluster, which are generally expected to also start up around the same time. The table can be provided to a broker via command-line arguments or via a configuration file/database at a specified location. Each broker is also provided its own ID as part of the initialization so it knows which are the other brokers it needs to connect to upon starting up. Similar mechanisms are used to pass on other configuration values such as the external port (e.g. port 1883) and the internal bridge port (e.g. port 1884) at start-up time.

When a client that is connected to a broker publishes a message for a given topic, it is the responsibility of the receiving broker to send that message to all the subscribers for that topic. For those subscribers that happen to be connected directly to that broker, the broker can send that message directly using the direct connection. However, since it is possible that there are other subscribers that are possibly connected to one or more other brokers in the cluster, it is the responsibility of the broker that receives a published message to forward it to each of the other brokers. Those brokers, in turn, would forward those messages to the subscribers that are directly connected to them.

It is possible to optimize the fan-out of such messages to only a subset of the brokers instead of sending to all the brokers, but such optimization techniques are beyond the scope of the present disclosure. So for the purposes of this disclosure "fan-out" refers to sending a received message to each of the others brokers with which the receiving broker has a bridge connection.

The present disclosure introduces a method according to which a broker always sends outgoing messages only on the bridge connections initiated by each of the remote brokers and similarly receives incoming messages only on the bridge connections that it initiated to each of the remote brokers. This design results in at least the following advantages:

It allows each broker to treat the bridge connections with other brokers for the most part as if they were regular client connections. For example, with MQTT protocol, SUBSCRIBE control packets are intended to be sent only by a client to a broker (and not the other way) and thus the subscriptions for the topic '#' (which will be done by a client to receive all traffic from the remote broker via the bridge) would fit naturally within this convention when the broker responds to that subscription by sending all messages to all topics via that bridge connection, just as it would send to any other client connection.

It enables each broker to determine when to create additional bridge connections to a remote broker based on the traffic metrics it observes based on the volume and latency of the messages it receives and its own ability to handle traffic increases subject to its own resource constraints.

It avoids deadlocks as well as duplicate connections in establishing bridge connections which could happen if there were only a single connection intended for both directions and both brokers try to establish that connection.

It keeps the bridging mechanism (including broker code) symmetric without requiring any further coordination between the brokers to realize all the above-mentioned advantages.

One of the potential pitfalls in the above-mentioned operation is the possibility of fan-out loops. For example, if Broker 1 received a message from its client C1 and forwards it to Broker 2 and Broker 3, then Broker 2 should not forward the same message to Broker 1 or Broker 3. Such fan-out loops can significantly degrade the performance of a system by clogging traffic with redundant messages. To prevent such loops, each broker should keep enough state to distinguish if a connection is a normal client connection or a bridge connection. This may be accomplished by techniques well understood in the art. And it should not forward any message that is received over a bridge connection from another broker. Such messages are intended only for distribution to the local subscribers of that broker. This way, it is the sole responsibility of the original broker that receives a published message from its original publisher to send it to all the other brokers.

When the brokers in the cluster are all functioning normally, it is possible that one of the TCP/IP connections between two brokers is broken. Each broker would detect that condition independently when they try to perform their next read or write operation on the connection. When such operations fail, it is the responsibility of the broker that initiated the original connection to retry its attempt to connect to the other brokers in a graceful manner such as using an exponential back-off mechanism with an upper bound. This ensures that there are neither deadlocks nor redundant connections.

During the period where such an inbound bridge connection is broken, it is possible that the sending broker receives a published message that ought to be forwarded to the receiving broker. Since the connection has been lost temporarily, it is the responsibility of the sending broker to persist such pending messages in a local or shared data store so that such messages are not lost. When the connection is eventually re-established, the sending broker would first send all the messages in the store to the remote broker before sending new messages. This permits the ordering of messages can be preserved with reasonable guarantees.

Figure 10:
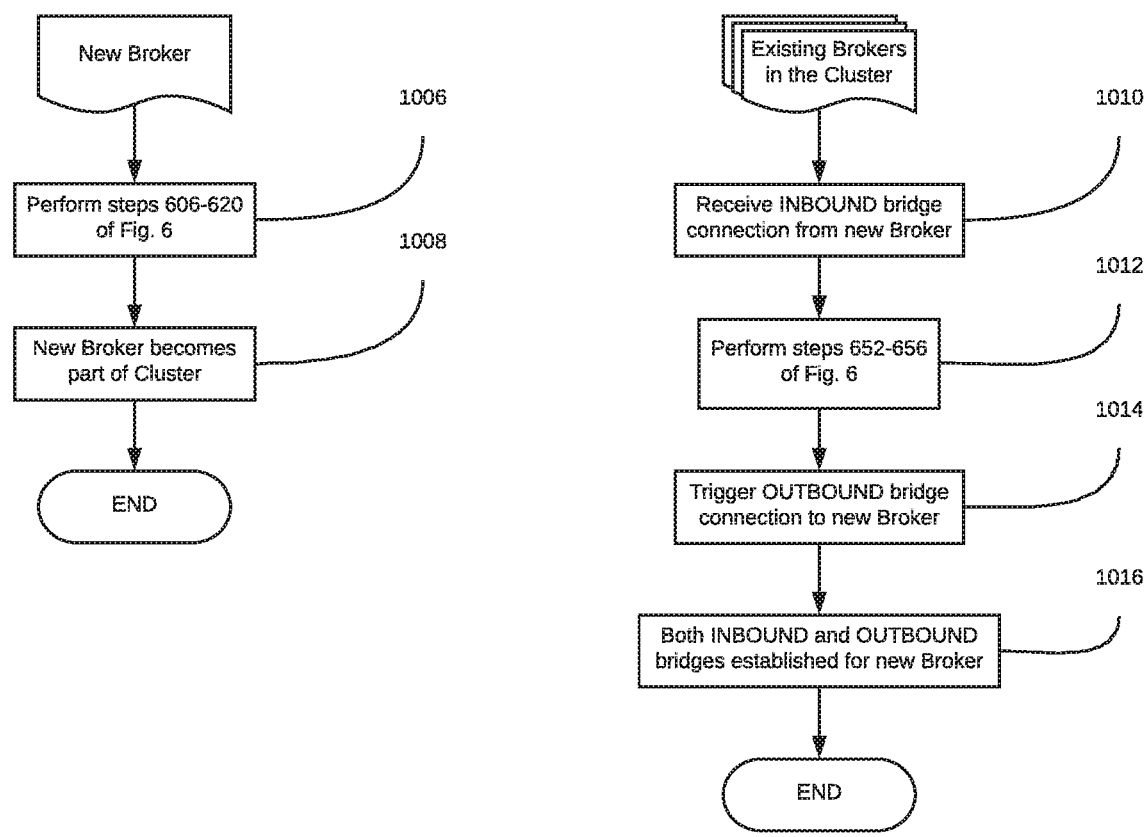
FIG. 10 is a flowchart illustrating steps used to add a broker to a live cluster.

While there are numerous advantages to a system in which all broker-to-broker connections are established before any of the brokers begin accepting messages from external publishers, there may be circumstances in which a new broker will be added to a live cluster where the public ports of all brokers already in the cluster are open and are already serving publishers and subscribers. FIG. 10 is a flowchart that illustrates how a new broker may be brought into a live cluster. In step 1002 the new broker is assigned an ID and an IP address, which are added to the ActiveBrokers table described in FIG. 9 in step 1004. One possible implementation choice for storing the ActiveBrokers table and making it available as a common source of truth for all brokers is a table in a shared database, which is accessible to all brokers. However, there may be other implementations that can provide alternate methods for informing existing brokers of updates to this table.

The subsequent steps involve both a first process that takes place on the new broker and a second process that takes place on the brokers in the pre-existing cluster. As part of the first process, in step 1006 the new broker instance is started up in the same way the existing brokers were started, following steps 606 through 620 as discussed in FIG. 6. Of special importance is the initiation by the new broker of new outbound connections to each of the brokers in the pre-existing cluster, as shown in step 608 in FIG. 6. When these steps have been completed, the new broker is ready to receive publications from publishers and to forward them to the other brokers in the cluster. After completion of this process, in step 1008 the new broker becomes part of the cluster, and can initiate and receive both bridges in communication with other brokers as well as receive messages from publishers and transmit them to subscribers.

In order to connect a new broker to the existing cluster, the brokers in the pre-existing cluster will follow a related process, also as shown in FIG. 10. From the perspective of an existing broker in the cluster, the addition of a new broker will result in an inbound connection request 1010. In a sense, this inbound request initiates the process by which the existing broker becomes aware of the existence of the new broker. This new inbound request will trigger the existing broker to perform step 1012, which consists of repeating steps 652 through 654 in FIG. 6. A key aspect of that process is that the existing broker will need to validate the IP address of the new broker by checking the ActiveBrokers table. Once the new broker has been authenticated, the existing broker accepts the inbound connection. Having established that connection, the existing broker then initiates an outbound connection to the new broker in step 1014, which may consist of performing most of the steps shown in FIG. 6 related to initiating an outbound bridge. However, since existing brokers are already operational and thus have already opened up their public port, the logic to wait for the inbound/outbound connections from/to the new broker doesn't apply.

Once the outbound connection to the new broker and inbound connection from the new broker are both successfully established 1016, the existing broker(s) include the new broker's bridge connection in their fan-out list and start forwarding new published messages from that point onwards.

Until step 1006 happens, existing brokers do not have to worry about storing any pending messages in the persistent data store for new brokers, since the new broker wouldn't accept any connection from clients until all the bridge connections have been established.

Figure 11:
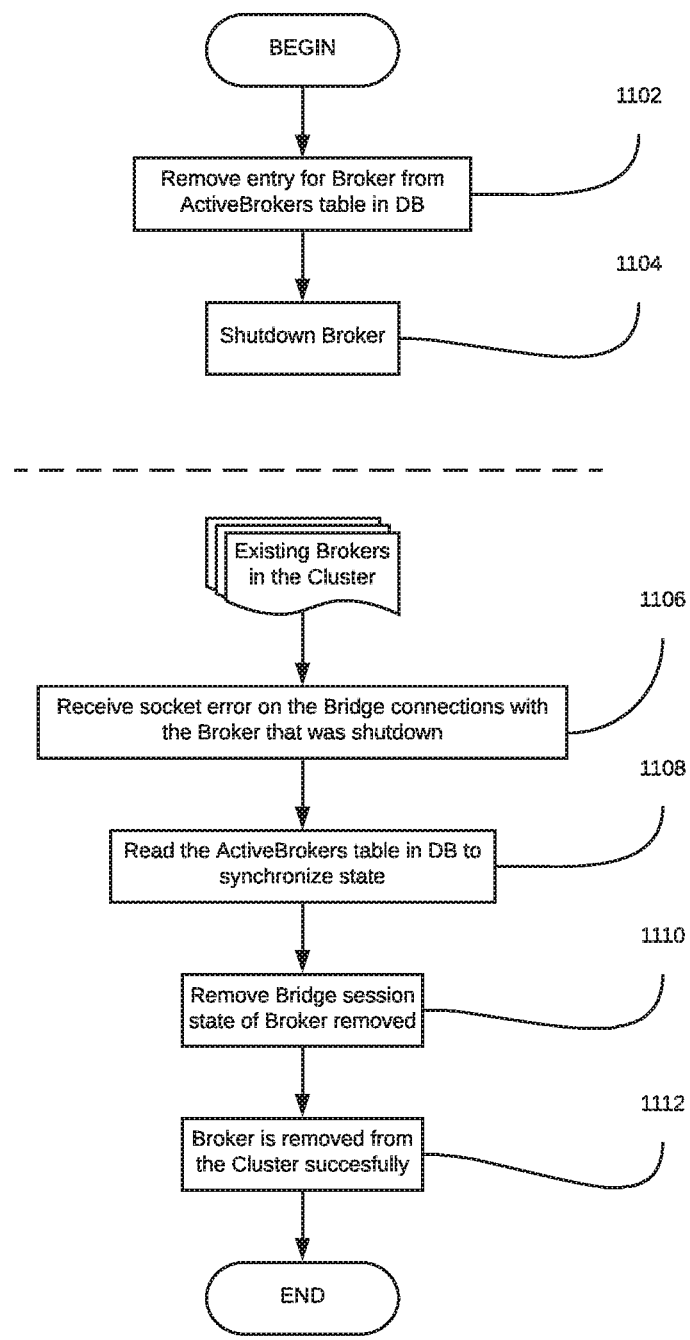
FIG. 11 is a flowchart illustrating steps used to remove a broker from a live cluster.

Another important aspect of the invention is the ability to remove an existing broker from service in an existing cluster in a manner that minimizes interference with the operation of clients and the other brokers. A method for accomplishing this task is illustrated in FIG. 11. In step 1102, the entry for the broker that is to be removed service is deleted from the ActiveBrokers table in the appropriate database. In step 1104 the broker that is to be removed service is shut down by whatever process is deemed appropriate for the orderly shutdown of such a computer.

The second aspect of the removal process is for the other brokers in the cluster to be informed of the removal. The use of the ActiveBrokers table permits the invention to perform this step automatically. At some point after a broker has been removed, each of the other brokers will eventually attempt to send a message to the disconnected broker. In step 1106, the sending broker receives a socket error message informing the sending broker that the removed broker cannot be reached. This result triggers the sending broker to perform step 1108, which is for the sending broker to read the then-current ActiveBrokers table from the master database. The sending broker then updates its local copy of the ActiveBroker table 1110 so that the local copy no longer includes the removed broker. This process is repeated for all of the remaining brokers in the cluster until in step 1112 the removed broker has been deleted from all live copies of the ActiveBroker table, and none of the remaining brokers will attempt to send messages to it.

Figure 12:
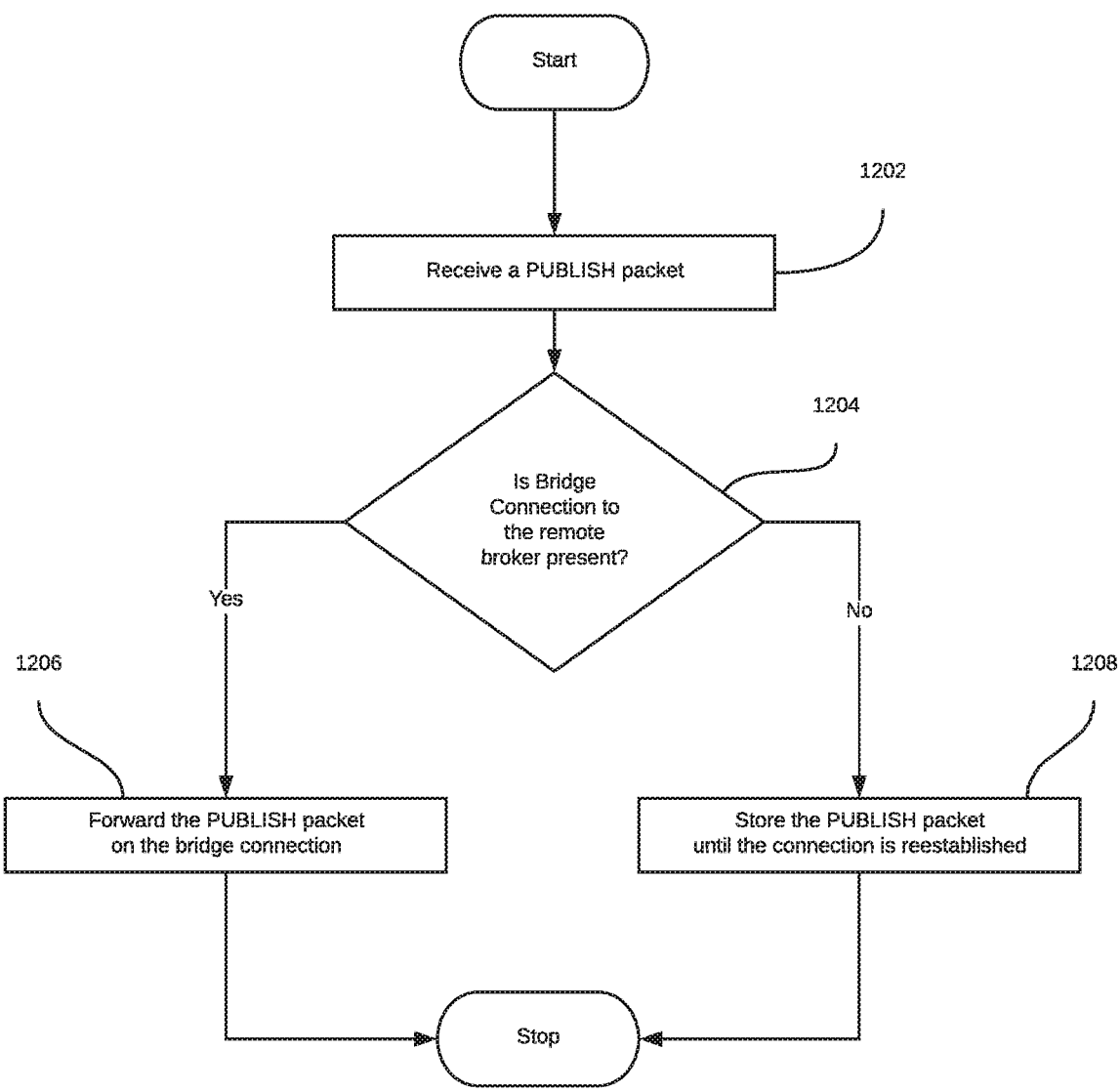
FIG. 12 is a flowchart illustrating a process that can be used by a broker.

Another aspect of the invention is the ability to recover from conditions such as an individual broker in a cluster failing, going offline, etc. FIG. 12 is a flowchart that Illustrates a process that can be used by a first broker operating as part of the subject invention to recover from such problems without failure to transmit data to subscribers. In step 1202, the first broker receives a PUBLISH packet—that is, a packet of information intended for one or more subscribers known to the broker to be connected to a different broker. In step 1204, the first broker determines whether a bridge connection to that other broker is present. If the appropriate bridge connection is present, then in step 1206 the first broker forwards the PUBLISH packet using the bridge connection. If the first broker determines that the bridge connection is not present, then in step 1208 the first broker stores the PUBLISH packet for later transmission.

While particular embodiments of the present invention have been shown and described, it is apparent that changes and modifications may be made without departing from the invention in its broader aspects, and, therefore, that the invention may be carried out in other ways without departing from the true spirit and scope. These and other equivalents are intended to be covered by the following claims.

What is claimed is:

1. In a publish-subscribe cluster comprising at least a first broker and a second broker, wherein at least a subscriber receives at least a message for a given topic published by at least a publisher connected to one of said first broker and second broker, a computer-implemented method comprising:
   at least said first broker accepting one or more inbound network connections from said second broker for the purpose of acting as a first bridge to send messages intended for one or more subscribers that are connected to said second broker;
   at least said first broker initiating one or more outbound network connections to said second broker for the purpose of acting as a second bridge to receive messages intended for one or more subscribers that are connected to said first broker;
   sending one or more messages on said first bridge intended for the one or more subscribers that are connected to atleast a subscriber on said second broker;
   receiving one or more messages on said second bridge intended for one or more subscribers that are connected to the first broker.

2. The method of claim 1 further comprising said first broker having access to information about a state of said second broker by validating that said second broker is listed as active in an active broker table.

3. The method of claim 2 further comprising using said active broker table to determine to which brokers to initiate said one or more outbound network connections.

4. The method of claim 2 further comprising using said active broker table to determine from which brokers to expect said one or more inbound network connections.

5. The method of claim 2 further comprising using said active broker table to validate a source address of said one or more inbound network connections before accepting them.

6. The method of claim 2 further comprising waiting for all of said one or more inbound and outbound network connections from brokers to be established before allowing publishers and subscribers to connect to brokers upon starting up one of said brokers.

7. The method of claim 1 wherein a first port on said first broker is used for accepting the one or more inbound network connections from at least an additional broker, and a second external port on said first broker is used for accepting connections from at least one publisher.

8. The method of claim 1 further comprising monitoring a status of one or more established outbound network connections from said first broker to at least an additional broker; and reinitiating at least an outbound network connection using one or more same connections in if said one or more established outbound network connections have previously been terminated.

9. The method of claim 1 further comprising monitoring a status of one or more accepted inbound network connections to said first broker from at least an additional broker; and storing pending messages destined for said additional broker during periods when said one or more accepted inbound network connections from said additional broker is broken, and transmitting said pending messages in a correct order when said one or more accepted inbound network connections have been restored.

10. A system for reducing latency between and among bridging brokers of a publish-subscribe cluster using a MQTT protocol comprised of at least a plurality of brokers within a single cluster, the system in each broker comprising:
at least memory comprising instructions;
at least a processor configured to execute instructions to:
accept on at least a first broker, one or more inbound network connections directly from at least a second broker from one or more additional brokers, each of said one or more inbound network connections acting as at least a first direct one-way bridge that receives one or more first messages intended for one or more first subscribers that are connected to said first broker, where said first direct one-way bridge is used only to receive said one or more first messages directly from said second broker without routing the one or more first messages through any intermediate brokers;
initiating on said first broker, one or more outbound network connections directly to said second broker, each of said one or more outbound network connections acting as a second direct one-way bridge that sends one or more second messages intended for one or more second subscribers that are connected to said second broker, where said second direct one-way bridge is used only to send said one or more second messages from said first broker to said second broker without routing the one or more second messages through any intermediate brokers;
receiving at said first broker, one or more messages on said first direct one-way bridge directly from said second broker without routing the one or more messages through any intermediate brokers, the one or more first messages intended for at least the one or more first subscribers a connected to said first broker wherein said one or more first messages are received directly from said second broker without routing the one or more first messages through any intermediate brokers; and
sending one or more second messages on said second direct one-way bridge directly from said first broker to said second broker without routing the one or more second messages through any intermediate brokers, the one or more second messages intended for at least the one or more second subscribers connected to said second broker wherein said one or more second messages are sent directly from said first broker to said second broker without routing the one or more second messages through any intermediate brokers.

11. The system of claim 10, wherein at least a processor on said first broker is further configured to execute instructions to access information about a state of said one or more additional brokers connected to said first broker, including validating that said second broker is listed as active in an active broker table;
use said active broker table to determine to which of said additional brokers outbound network connections should be initiated;
use said active broker table to determine which of said additional brokers to expect the one or more inbound network connections from; and
use said active broker table to validate a source address of said one or more inbound network connections before accepting them.

12. The system of claim 10, wherein said processor is further configured to execute instructions to wait for all inbound and outbound network connections to said first broker to be established before allowing publishers and subscribers to connect to said first broker upon starting up of said first broker.

13. The system of claim 10, wherein said one or more inbound and outbound network connections use a first port on said first broker to connect said first broker with at least an additional broker, and a second port for accepting connections from at least one publisher.

14. The system of claim 10, wherein said processor in said first broker is further configured to:
execute instructions to monitor a status of said one or more outbound network connections from said first broker to said second broker
reinitiating at least the one or more outbound network connections if said one or more outbound network connections have previously been terminated;
monitoring a status of one or more accepted inbound network connections to said first broker from said second broker; and
storing pending messages destined for said first broker during periods when said one or more inbound network connections are broken, and transmitting said pending messages in a correct order when said one or more inbound network connections have been restored.

15. The system of claim 10, wherein said processor of said first broker is further configured to execute instructions to monitor a status of one or more accepted inbound network connections from at least an additional broker; and to store pending messages destined for said additional broker during a period when said one or more accepted inbound network connections from said one or more additional brokers are broken.

16. A non-transitory machine-readable storage medium comprising machine-readable instructions for reducing latency by causing a processor to execute a method for bridging brokers using a MQTT protocol, the method comprising:
accepting on a first broker one or more inbound network connections directly from at least a second broker from one or more additional brokers for a purpose of establishing a first direct one-way bridge to receive one or more first messages intended for one or more first subscribers that are connected to said first broker, where said first direct one-way bridge is used only to receive messages directly from said second broker without routing the one or more first messages through any intermediate brokers;

initiating one or more outbound network connections directly from said first broker to said second broker for a purpose of acting as a second direct one-way bridge to receive one or more second messages intended for one or more of second subscribers directly connected to said second broker, where said second direct one-way bridge is used only to send messages directly from said first broker to said second broker directly without routing the one or more second messages through any intermediate brokers;

receiving the one or more first messages on said first direct one-way bridge intended for the one or more first subscribers connected said first broker without routing the one or more first messages through any intermediate brokers;

send the one or more second messages on said second direct one-way bridge intended for the one or more second subscribers connected to said first second broker wherein said one or more second messages are sent directly from said first broker to said second broker without routing the one or more second messages through any intermediate brokers.

17. The non-transitory machine-readable storage medium of claim 16 further comprising:

having access to information about a state of said additional brokers connected to said first broker; using said information to determine which brokers to initiate the one or more outbound network connections to, including validating that said one or more additional brokers are listed as active in an active broker table;

using said information to determine to which of said one or more additional brokers the one or more outbound network connections should be initiated; and using said information to validate a source address of said one or more inbound network connections before accepting them.

18. The non-transitory machine-readable storage medium of claim 16 further comprising, upon starting said first broker, waiting for the one or more inbound and outbound network connections to be established before allowing publishers and subscribers to connect to said first broker.

19. The non-transitory machine-readable storage medium of claim 16 wherein said one or more inbound and outbound network connections use a first port on said first broker to connect said first broker with at least an additional broker, and a second port for accepting connections from at least one publisher.

20. The non-transitory machine-readable storage medium of claim 16 further comprising monitoring the a status of one or more established outbound network connections to one or more remote brokers; and reinitiating the one or more established outbound network connections.

21. The non-transitory machine-readable storage medium of claim 16 wherein said first broker monitors a the status of one or more accepted inbound network connections from said one or more additional brokers; and stores pending messages destined for said one or more additional brokers when said one or more inbound network connections to said one or more additional brokers are broken, and transmitting said pending messages in a correct order when said one or more inbound network connections have been restored.

* * * * *